(12) United States Patent
Brausen

(10) Patent No.: US 8,834,210 B2
(45) Date of Patent: Sep. 16, 2014

(54) ELECTRIAL OUTLET SAFETY DEVICE

(76) Inventor: Daniel John Brausen, Little Canada, MN (US)

(*) Notice: Subject to any disclaimer, the term of this patent is extended or adjusted under 35 U.S.C. 154(b) by 144 days.

(21) Appl. No.: 13/593,691

(22) Filed: Aug. 24, 2012

(65) Prior Publication Data

US 2013/0052882 A1   Feb. 28, 2013

Related U.S. Application Data

(60) Provisional application No. 61/526,711, filed on Aug. 24, 2011.

(51) Int. Cl.
*H01R 9/22*       (2006.01)
*H01R 13/713*     (2006.01)
*H01R 31/06*      (2006.01)
*H01R 25/00*      (2006.01)
*H01R 13/621*     (2006.01)

(52) U.S. Cl.
CPC ............ *H01R 31/065* (2013.01); *H01R 25/006* (2013.01); *H01R 13/621* (2013.01); *H01R 13/7135* (2013.01)
USPC ........................................................ 439/718

(58) Field of Classification Search
USPC ......... 439/718, 367, 373, 371, 536, 652, 650, 439/488–490
See application file for complete search history.

(56) References Cited

U.S. PATENT DOCUMENTS

| | | | |
|---|---|---|---|
| 4,079,344 A | 3/1978 | Lauben et al. | |
| 4,816,957 A | 3/1989 | Irwin | |
| 5,401,184 A * | 3/1995 | Sundstrom et al. | 439/367 |
| 6,120,320 A | 9/2000 | Veiga et al. | |
| 6,445,188 B1 * | 9/2002 | Lutz et al. | 324/508 |
| 7,038,561 B2 | 5/2006 | Esty | |
| 7,311,558 B2 | 12/2007 | Adams et al. | |
| 7,482,537 B1 | 1/2009 | Shotey et al. | |
| 7,756,268 B2 | 7/2010 | Hazani et al. | |
| 7,880,086 B1 | 2/2011 | Shotey et al. | |
| 8,558,710 B1 * | 10/2013 | Nitz | 340/657 |

* cited by examiner

*Primary Examiner* — Jean F Duverne
(74) *Attorney, Agent, or Firm* — Buckingham, Doolittle & Burroughs, LLC

(57) ABSTRACT

An electrical safety device for updating an existing electrical outlet into a Ground Fault Circuit Interrupter (GFCI)/Arc Fault protected receptacle. The electrical safety device is a surface mounted GFCI/Arc Fault receptacle for converting a grounded or ungrounded electrical receptacle with limited electrocution protection into semi-permanent GFCI/Arc Fault protected outlet that is not easily removed.

19 Claims, 4 Drawing Sheets

ELECTRICAL OUTLET SAFETY DEVICE

CROSS-REFERENCE

This application claims priority from Provisional Patent Application Ser. No. 61/526,711 filed Aug. 24, 2011.

FIELD OF THE INVENTION

This invention pertains generally to a safety device adaptable to existing unprotected electrical outlets, and more particularly to a surface mounted Ground Fault Circuit Interrupter (GFCI)/Arc Fault receptacle for converting grounded or ungrounded electrical receptacles into permanent GFCI/Arc Fault protected outlets.

BACKGROUND

Existing ungrounded or unprotected electrical receptacles present a significant hazard of electrical shock to users in proximity to grounded surfaces, such as kitchen sink counters, bathrooms, exterior receptacles, basements, garages, and laundry and pool areas. In addition to the electrical hazard, existing out-dated two-blade electrical receptacles are highly inconvenient when attempting to use a modern electrical device designed to be plugged into a three-prong receptacle. Similarly, receptacles located throughout bedrooms, dens, living rooms, and other living areas can present the risk of fire when an electrical device with potentially faulty components, such as a lamp with the wrong bulb or frayed internal wiring, are used by a person who may fall asleep during use or who leaves the room.

Compounding the safety issue are new building code regulations that require updated electrical protection prior to a home sale or new tenant occupying a residence. Traditional solutions include completely replacing the outlets, completely rewiring the outlet, or employing a temporary add-on protection device. Typically, permanent solutions require homeowners to hire a qualified electrical contractor at great expense. However, many homeowners attempt to do the work themselves without the proper knowledge, skill, and without having the work inspected for compliance with the regulations. Furthermore, temporary add-on devices may easily be removed intentionally or unintentionally, thereby nullifying the protection. Modern GFCI replacement outlets are often too large for existing electrical boxes requiring substantial additional remodeling with the associated costs.

Consequently, there is a need for a quick, simple, economical solution to update existing electrical receptacles to improve safety and to meet modern building code requirements. The present invention discloses a surface mounted GFCI/Arc Fault receptacle for converting a grounded or ungrounded existing duplex or quadplex receptacle into a two to six outlet, three-prong GFCI and/or Arc Fault protected receptacle. The device provides simulated ground protection to a two-blade receptacle complex by converting it to a three-prong outlet. The invention allows individuals to quickly and safely modify existing receptacles economically without any specialized knowledge or the need to cut off the power supply.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an electrical safety device for converting an unprotected existing electrical outlet into a GFCI and/or Ground Fault protected receptacle. The electrical safety device comprises existing GFCI/Arc Fault circuitry integrated into a housing assembly with a mounting element for securing the electric safety device to the unprotected existing electrical outlet without the need to disassemble the outlet during installation. The electrical safety device is installable by removing an existing cover plate from a duplex or quadplex receptacle and pressing a plurality of blades and/or prongs into the receptacle, and then securing the electrical safety device with the mounting element.

Furthermore, in the preferred embodiment of the invention, the electrical safety device converts an unprotected two-prong or three-prong receptacle into a protected three-prong protected outlet. The mounting element comprises a one-way, non-retractable mounting screw for permanently coupling the electrical safety device to the unprotected outlet. Additional stabilization is provided by the plurality of blades and/or the prongs so that the coupled elements are fixed in place and resist movement once installed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
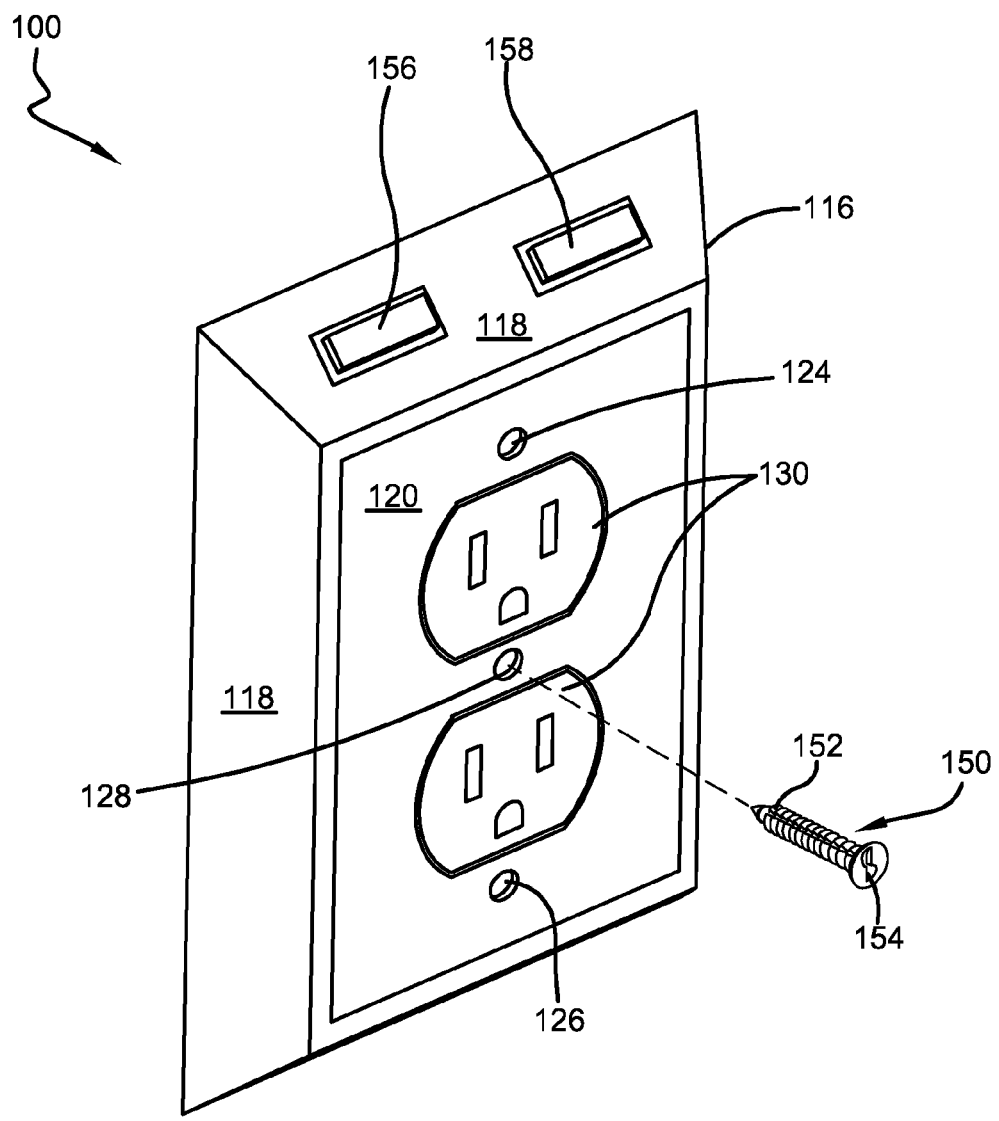
FIG. 1 illustrates a front perspective view of an electrical outlet safety device in accordance with the disclosed architecture.

The present invention discloses an electrical safety device for coupling with an existing unprotected electrical outlet to provide Ground Fault and/or Arc Fault protection to enhance safety and comply with modern building code requirements without the need to rewire the entire outlet or to first cut off the power supply. The preferred embodiment allows a layperson, without any extensive electrical knowledge, to quickly and easily convert an unprotected receptacle into a protected one. The electrical safety device comprises a housing assembly and a plug assembly. The electrical safety device also comprises a mounting element for permanently or semi-permanently coupling the electrical safety device to the unprotected outlet where the electrical safety device is surface mounted and not installed within an existing outlet box. The electrical safety device provides a simple to install, economical alternative for upgrading electrical safety.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 2:
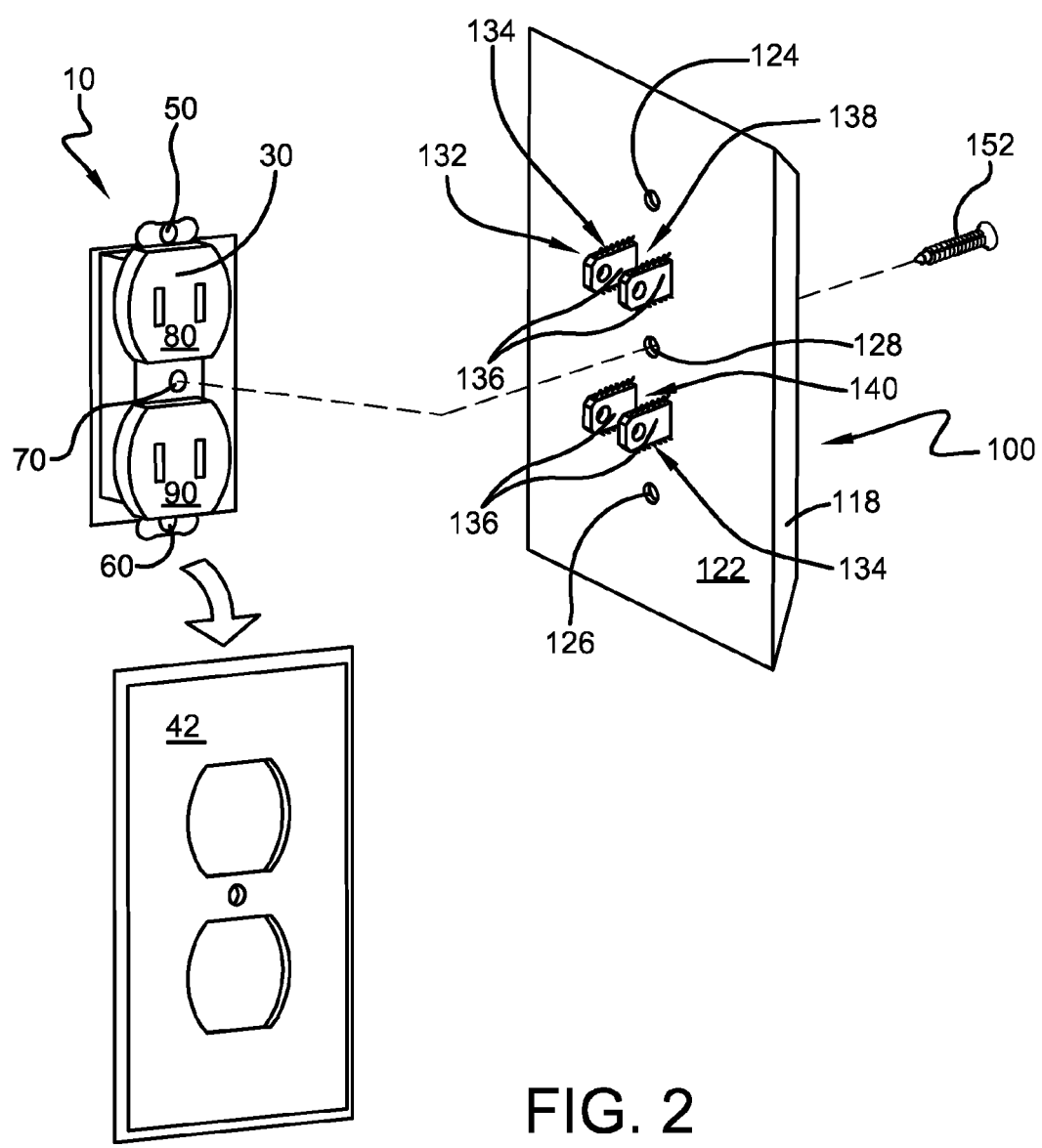
FIG. 2 illustrates an exploded rear perspective view of an electrical outlet safety device for use with an unprotected two-prong outlet in accordance with the disclosed architecture.
Figure 3:
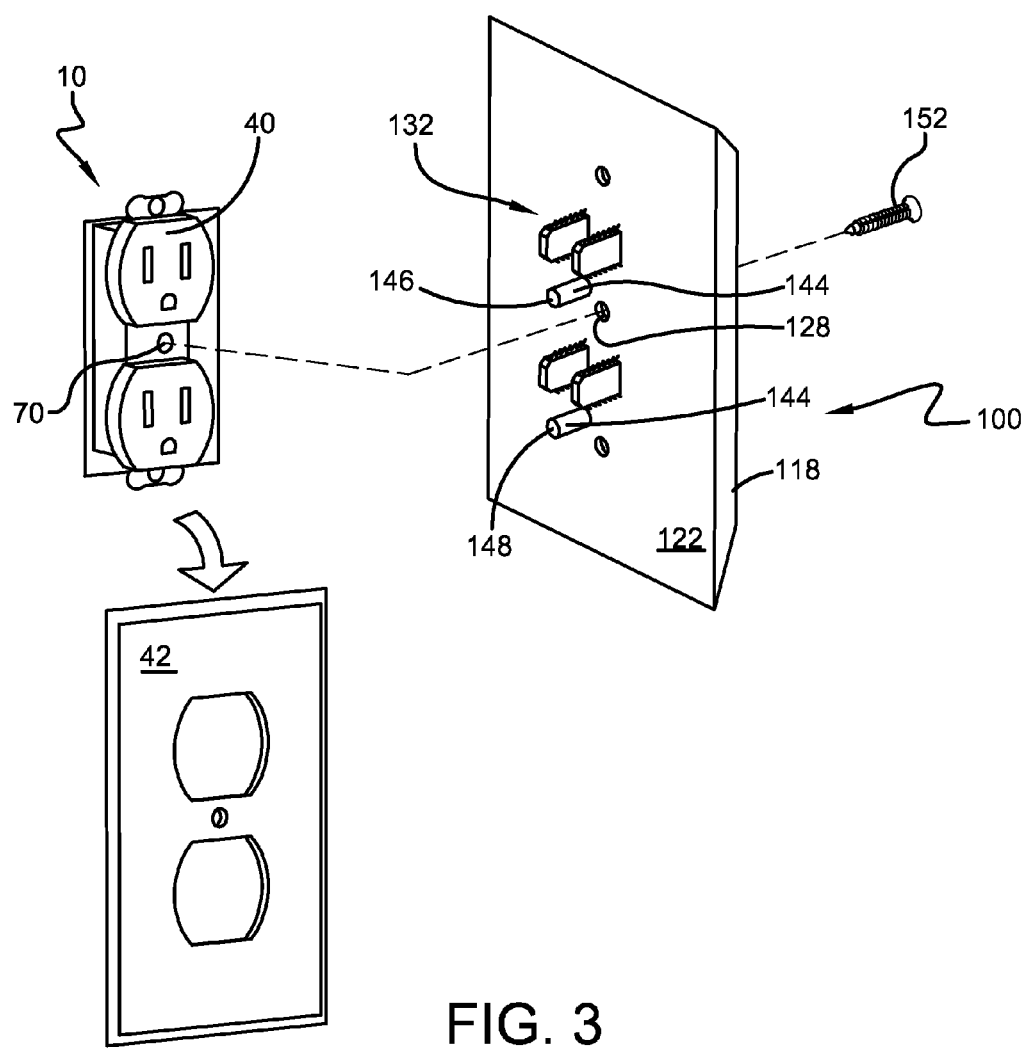
FIG. 3 illustrates an exploded rear perspective view of an electrical outlet safety device for use with an unprotected three-prong outlet in accordance with the disclosed architecture.

Illustrated in FIG. 1 is an electrical safety device 100 for use in updating a less protected electrical outlet into a more protected outlet. FIGS. 2 and 3 show an unprotected receptacle 10, wherein the unprotected receptacle 10 does not have either Ground Fault Circuit Interrupter (GFCI) or Arc Fault protection. Residential electrical wiring systems typically employ either two or three wiring systems. A two wire system has a hot wire and a neutral wire, wherein the neutral wire is used to sense the lack of a ground and shut off in the event of a significant current imbalance. Typically two wire systems utilize the unprotected outlet 10 as shown in FIG. 2 where the unprotected outlet 10 is a two-prong outlet 30. GFCI's work on the two wire system by internally sensing and correcting this current imbalance at a much smaller amperage between the hot and the neutral wires and by interrupting the circuit prior to causing an electrocution hazard caused by a ground fault. An Arc Fault Circuit Protector detects an unintended electrical arc in an appliance, such as a lamp with a frayed wire, and interrupts the power to the circuit before the arc causes a fire.

A three wire system includes a ground wire with a three-prong outlet 40, as seen in FIG. 3, to protect against electrocution by providing a lower resistance path for the electricity to follow in the event of a short or ground fault. However, as the GFCI detects and interrupts the circuit much faster than a traditional fuse or circuit breaker, the GFCI significantly decreases the likelihood of electrocution. Modern building codes require the greater protection of the GFCI in higher hazard areas such as bathrooms, basements, kitchens, and the like. However, existing prior art devices either require significant electrical knowledge to install, or are easily removable thereby defeating the purpose of the code if removed.

Figure 4:
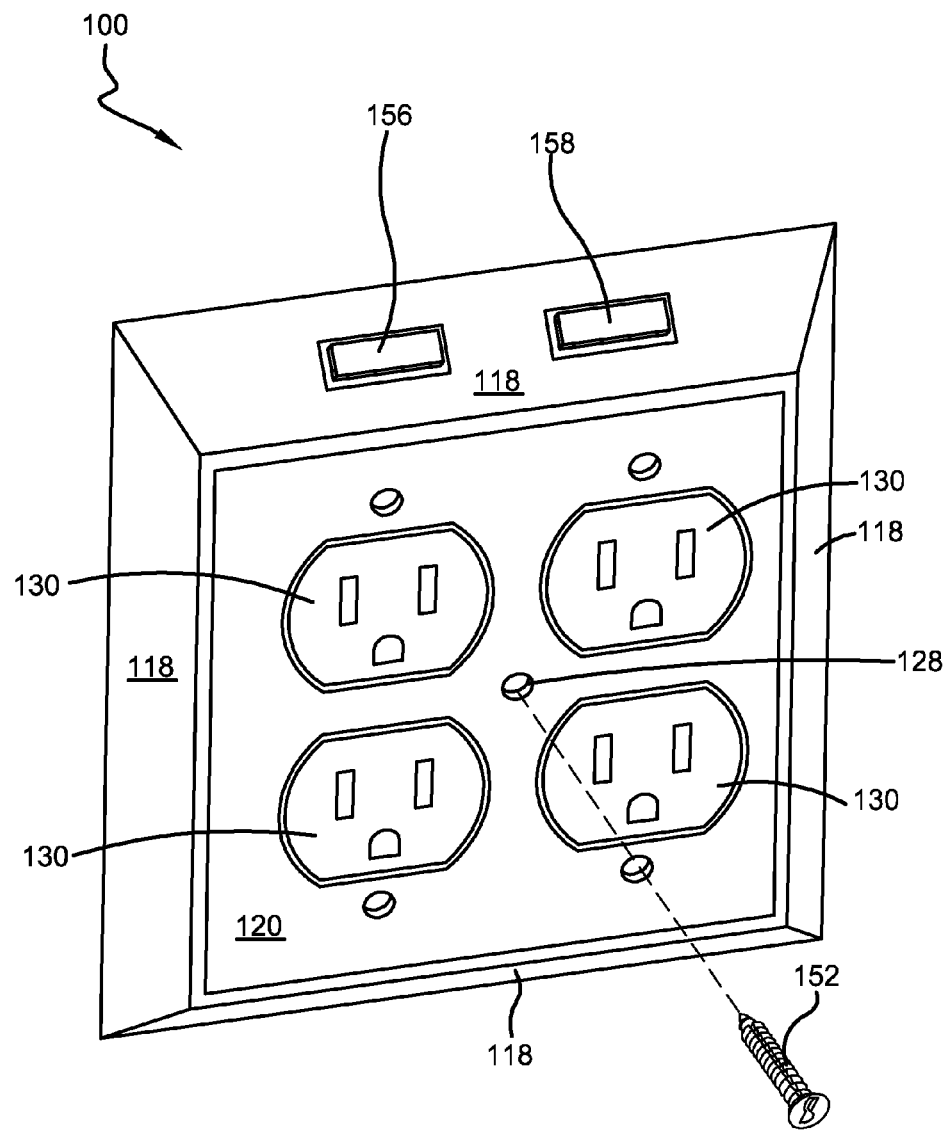
FIG. 4 illustrates a front perspective view of an electrical outlet safety device for use in converting an unprotected two outlet receptacle into a protected four outlet receptacle accordance with the disclosed architecture.

Returning to FIG. 1, the electrical safety device 100 once installed with the unprotected receptacle 10 creates a protected receptacle. Both the electrical safety device 100 and the unprotected receptacle 10 may be duplex, quadplex, or multiplex as desired. For example, FIG. 1 illustrates a duplex, or two-plug, outlet capable of accepting two plugs. FIG. 4 illustrates a quadplex, or four-plug embodiment of the invention. While the majority of applications may require the duplex or the quadplex option, the inventor contemplates an embodiment where a multiplex option having between six and ten plugs may be advantageous as well. Additionally, the unprotected receptacle 10 may be duplex, but the protected receptacle may be duplex, quadplex, or multiplex as desired. This is advantageous as it allows a user to safety increase the number of plugs available for use. The electrical safety device 100 also converts either a two-prong outlet 30 or three-prong outlet 40 into a three-prong protected outlet comprising either GFCI or Arc Fault protection.

The electrical safety device 100 comprises a housing assembly 116 and a plug assembly 130. The housing assembly 116 comprises four sides 118, a face plate 120, and a back 122. The housing assembly 116 is typically constructed from plastic, although it is contemplated that other suitable materials, including without limitation nylon, or polymer, and the like may be used without affecting the overall scope of the invention. The housing assembly 116 typically comprises a rectangular shape where the electric safety device 100 is approximately between four and six inches in height, approximately between two and ten inches in width. However, this is not meant as a limitation as the electric safety device 100 may be of larger and/or smaller dimensions, without deviating from the scope of the invention. For example, the only dimensional limitation is that the back 112 must completely cover an opening holding the unprotected receptacle 10 when a cover plate 42, as seen in FIGS. 2 and 3 is removed prior to installation.

The housing assembly 116 further comprises a top through-hole 124, a bottom through-hole 126, and a center mounting aperture 128. The top through-hole 124 and the bottom through-hole 128 transect the face plate 120, the back 122, and the plug assembly 130. Furthermore, the top through-hole 124 and the bottom through-hole 128 are in line with a top mounting screw 50 and a bottom mounting screw 60 respectively of the unprotected receptacle 10. Similarly, the center mounting aperture 128 is in line with a center hole 70 located between a top plug 80 and a bottom plug 90 in the unprotected receptacle 10. When installed, the electrical safety device 100 is surface mountable over the unprotected receptacle 10 so that the back 122 substantially covers the unprotected receptacle 10.

The plug assembly 130 comprises a ground fault circuit interrupter or an arc fault circuit interrupter. The plug assembly 130 is integrated within the housing assembly 116 so that the plug assembly 130 is substantially encased or encapsulated by the housing assembly 116. When installed, the plug assembly 130 is in electrical communication with the unprotected receptacle 10, thereby converting the unprotected receptacle 10 into either a GFCI protected or Arc Fault protected receptacle.

The plug assembly 130 further comprises a plurality of contact elements 132 that extend rearwardly through the back 122 of the housing assembly 116. At least two of the plurality of contact elements 132 electrically communicate with the unprotected receptacle 10 by plugging directly into the top plug 80 and the bottom plug 90 in a duplex receptacle, or into as many plugs as may be available in the unprotected receptacle 10. The plurality of contact elements 132 comprise at least a first pair of contact blades 138 and a second pair of contact blades 140. Protecting the two-prong unprotected outlet 30 as illustrated in FIG. 2, is accomplished when the first pair of contact blades 138 engage the top plug 80, and the second pair of contact blades 140 which are electrically isolated engage the bottom plug 90 of the unprotected receptacle 10. To protect a three-prong unprotected outlet 40, as illustrated in FIG. 3, the plurality of contact elements 132 further comprise a plurality of grounding prongs 144. To protect the duplex receptacle, the plurality of grounding prongs 144 comprise a first grounding prong 146 for engaging the top plug 80 in conjunction with the first pair of contact blades 138, and a second grounding prong 148 for engaging the bottom plug 90 in conjunction with the second pair of contact blades 140.

The plurality of contact elements 132 may comprise additional contact blades and grounding prongs as required. For example, the plurality of contact elements in the electrical safety device 100 illustrated in FIG. 4 further comprise four pairs of contact blades (not shown). Additionally, the plurality of grounding prongs 144 may further comprise four corresponding grounding prongs (not shown) depending on the nature of the unprotected outlet 10 to be upgraded. Similarly, this is not meant as a limitation as any number of pairs of contact blades and/or grounding prongs may be employed as desired depending on the size of the unprotected outlet 10.

In addition to providing electrical communication, the plurality of contact elements 132 further help to stabilize the electrical safety device 100 on the unprotected outlet 10. Preferably the plurality of contact elements 132 further comprise a plurality of barbed contact blades 136. As illustrated in FIG. 2, the plurality of barbed contact blades 136 employ a plurality of micro-barbs 134 for engaging with the unprotected receptacle 10. The plurality of micro-barbs 134 are advantageous as they create a series of angled points of contact with the top plug 80 and the bottom plug 90. The plurality of micro-barbs 134 are angled away from the back 122 of the housing assembly 116 so as to facilitate installation of the electrical safety device 100, while simultaneously substantially preventing easy removal as the barbs resist a pulling movement Not only does this enhance stabilization of the electrical safety device 100 once installed, but it makes removal of the electrical safety device 100 unlikely without a destructive act. This is advantageous as it does not permit easy removal of the electrical safety device 100 once installed so that the protection is not inadvertently easily undone. Therefore, once installed, the electrical safety device 100 becomes a substantially permanent GFCI or Arc Fault converter without the need to rewire the unprotected outlet 10. While the plurality of micro-barbs 134 are preferred, they are not required as the inventor contemplates an embodiment with less permanent installations as described infra.

The electrical safety device 100 further comprises a mounting element 150 for coupling the electrical safety device 100 to the unprotected receptacle 10. While the mounting element 150 is preferably non-removable, it may be removable as well. The mounting element 150 preferably comprises a one-way non-retractable screw 152 which serves to limit movement of the electrical safety device 100 and to prevent removal. The one-way non-retractable screw 152 may comprise a one-way drive head screw 154 which is insertable through the center mounting aperture 128 and into the center hole 70 of the unprotected receptacle 10. However, this is not meant as a limitation as the mounting element 150 may further comprise any type of screw, such as a screw with micro-barbs similar to the plurality of micro-barbs 134 discussed supra, a square head screw, and the like as is known in the art without affecting the overall scope of the invention. Once installed, the semi-permanent embodiment of the electrical safety device 100 is only removable by accessing and unscrewing the top mounting screw 50 and the bottom mounting screw 50 of the unprotected receptacle 10 through the top through-hole 124 and the bottom through-hole 126. Once unscrewed, the electrical safety device 100 and unprotected receptacle 10 may be removed as a unit thereby preventing bypassing the added protection.

The electrical safety device 100 further comprises a circuit testing element 156 and a circuit resetting element 158 found in existing GFCI outlets. The electrical safety device 100 may also comprise weather-stripping and/or a weatherproof cover for outdoor applications as necessary.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrical safety device for converting an unprotected electrical receptacle into a protected receptacle, the electrical safety device comprising:
    a housing assembly comprising four sides, a faceplate, and a back;
    a plug assembly integrated within the housing assembly in electrical communication with the unprotected electrical receptacle, wherein a plurality of contact elements comprise a first pair of contact blades that engage only a top plug of the unprotected electrical receptacle and a second pair of contact blades that engage only a bottom plug of the unprotected electrical receptacle, the plurality of contact elements extending rearward through the back of the housing assembly and are connectable with the unprotected electrical receptacle; and
    a mounting element for permanently coupling the electrical safety device to the unprotected electrical receptacle.

2. The electrical safety device of claim 1, wherein the unprotected receptacle is a duplex receptacle and the protected receptacle is a protected duplex receptacle.

3. The electrical safety device of claim 1, wherein the unprotected receptacle is a duplex receptacle and the protected receptacle is a protected quadruplet receptacle.

4. The electrical safety device of claim 1, wherein the unprotected receptacle is a duplex receptacle and the protected receptacle is a protected multiplex receptacle.

5. The electrical safety device of claim 1, wherein the electrical safety device converts a two-prong unprotected outlet into a three-prong protected outlet via incorporating an Arc Fault circuit interrupter.

6. The electrical safety device of claim 1, wherein the electrical safety device converts a three-prong unprotected outlet into a three-prong protected outlet via incorporating a ground fault circuit interrupter.

7. An electrical safety device for converting an unprotected electrical receptacle into a Ground Fault Circuit Interrupter protected receptacle, the electrical safety device comprising:
　a housing assembly comprising four sides, a faceplate, and a back, wherein the faceplate and the back have a top and a bottom through-hole aligned with a top and a bottom mounting screw of the unprotected receptacle; and
　a plug assembly in electrical communication with the unprotected electrical receptacle, wherein the plug assembly is encased within the housing assembly, and wherein a plurality of contact elements comprise a first pair of contact blades that engage only a top plug of the unprotected receptacle and a second pair of contact blades that engage only a bottom plug of the unprotected receptacle, the plurality of contact elements extending rearwardly through the back of the housing assembly and are connectable with the unprotected electrical receptacle; and
　a mounting element for non-removably coupling the electrical safety device to the unprotected electrical receptacle.

8. The electrical safety device of claim 7, wherein the plurality of contact elements further comprise a first grounding prong and a second grounding prong.

9. The electrical safety device of claim 7, wherein the plurality of contact elements comprise four pairs of contact blades.

10. The electrical safety device of claim 7, wherein a center-mounting aperture transects the housing assembly and the plug assembly from front to back.

11. The electrical safety device of claim 7, wherein the mounting element comprises one-way drive head screw element partially insertable through the center mounting aperture and into a center hole in the unprotected electrical receptacle.

12. The electrical safety device of claim 7, further comprising a circuit testing element and a circuit resetting element.

13. An electrical safety device for converting an unprotected electrical receptacle into an Arc-Fault protected receptacle, the electrical safety device comprising:
　a housing assembly comprising four sides, a faceplate, and a back;
　a plug assembly in electrical communication with the unprotected electrical receptacle, wherein the plug assembly is integrated within the housing assembly, and wherein a plurality of contact elements comprise a first pair of contact blades that engage only a top plug of the unprotected receptacle and a second pair of contact blades that engage only a bottom plug of the unprotected receptacle, the plurality of contact elements extending rearwardly through the back of the housing assembly and are connectable with the unprotected electrical receptacle; and
　a mounting element for non-removably coupling the electrical safety device to the unprotected electrical receptacle, wherein the mounting element comprises a one-way non-retractable screw.

14. The electrical safety device of claim 13, wherein the plurality of contact elements comprise a plurality of barbed contact blades.

15. The electrical safety device of claim 14, wherein the plurality of contact elements further comprise a plurality of grounding prongs.

16. The electrical safety device of claim 13, wherein the plurality of contact elements in conjunction with the one-way non-retractable screw stabilize the electrical safety device once installed.

17. The electrical safety device of claim 13, wherein the plurality of contact elements each employ a plurality of micro-barbs to stabilize the electrical safety device.

18. The electrical safety device of claim 13, wherein the electrical safety device is a plug-in, permanent Arc-Fault converter.

19. The electrical safety device of claim 13, wherein the electrical safety device is mounted flush with a wall surface over the unprotected electrical receptacle.

* * * * *